United States Patent
Plumb

(10) Patent No.: US 8,209,423 B2
(45) Date of Patent: *Jun. 26, 2012

(54) MOBILE SERVER WITH MULTIPLE SERVICE CONNECTIONS

(75) Inventor: Marc Plumb, Waterloo (CA)

(73) Assignee: Research In Motion Limited, Waterloo (CA)

(*) Notice: Subject to any disclaimer, the term of this patent is extended or adjusted under 35 U.S.C. 154(b) by 140 days.

This patent is subject to a terminal disclaimer.

(21) Appl. No.: 12/836,707

(22) Filed: Jul. 15, 2010

(65) Prior Publication Data

US 2010/0281531 A1    Nov. 4, 2010

Related U.S. Application Data

(63) Continuation of application No. 11/876,872, filed on Oct. 23, 2007, now Pat. No. 7,818,434.

(51) Int. Cl.
*G06F 15/16* (2006.01)

(52) U.S. Cl. ............... 709/227; 709/203; 726/3; 726/12

(58) Field of Classification Search .................. 709/203, 709/227; 726/3, 11, 12
See application file for complete search history.

(56) References Cited

U.S. PATENT DOCUMENTS

| | | |
|---|---|---|
| 2003/0054810 A1 | 3/2003 | Chen et al. |
| 2006/0223504 A1 | 10/2006 | Ishak et al. |
| 2007/0191033 A1* | 8/2007 | Marais ......................... 455/466 |
| 2008/0010676 A1* | 1/2008 | Dosa Racz et al. ............. 726/11 |
| 2008/0086564 A1 | 4/2008 | Putman et al. |

FOREIGN PATENT DOCUMENTS

| | | |
|---|---|---|
| WO | 01/69953 | 9/2001 |
| WO | 03/049402 | 6/2003 |
| WO | WO 03049402 A1 * | 6/2003 |
| WO | 2007-067109 | 6/2007 |
| WO | 2007/075213 | 7/2007 |

OTHER PUBLICATIONS

Extended European Search Report for EP 07119045.8 dated Feb. 13, 2008.
International Preliminary Report on Patentability for PCT/CA2008/001876 dated Oct. 1, 2009.
International Search Report PCT/CA2008/001876 dated Feb. 4, 2009.

* cited by examiner

*Primary Examiner* — Ario Etienne
*Assistant Examiner* — El Hadji Sall
(74) *Attorney, Agent, or Firm* — Ridout & Maybee LLP

(57) ABSTRACT

A method of communicating between a mobile communications device and a plurality of services that are used by the mobile communications device. The method includes establishing, through a firewall and a wireless network, a first communications session between the mobile communications device and a mobile server located in an enterprise network with which the mobile communications device is associated; and establishing, concurrent with the first communications session at least one further communications session between the mobile server and a service, the at least one further communications session being established by the mobile server as a session proxy for the mobile communications device.

10 Claims, 3 Drawing Sheets

MOBILE SERVER WITH MULTIPLE SERVICE CONNECTIONS

CROSS-REFERENCE TO RELATED APPLICATIONS

This application claims the benefit of the filing date of U.S. patent application Ser. No. 11/876,872 filed 23 Oct. 2007 under the title MOBILE SERVER WITH MULTIPLE SERVICE CONNECTIONS. The content of the above application is hereby expressly incorporated by reference into the detailed description hereof.

FIELD

The present application relates to mobile communication devices and, more particularly, to methods and apparatus for connecting such devices to multiple services.

BACKGROUND

A mobile communications device may exchange data with a number of different services, including for example an email service, peer-to-peer messaging services, and other content delivery services. In some cases, a mobile communications device may have to maintain simultaneous connections to receive data from a plurality of services, which can tie up the computing and memory resources of the device, as well as wear down the battery of the device. In some cases, a remote relay outside of an enterprise's firewall may be used to connect to the multiple services, with the device only maintaining a single connection to the relay. However, conditions can exist that make use of such an external relay impractical or inefficient.

Accordingly, an improved method and apparatus for facilitating connections between a mobile communications device and multiple services is desirable

DETAILED DESCRIPTION

According to one example embodiment is a method of communicating between a mobile communications device and a plurality of services that are used by the mobile communications device. The method includes establishing, through a firewall and a wireless network, a first communications session between the mobile communications device and a mobile server located in an enterprise network with which the mobile communications device is associated; and establishing, concurrent with the first communications session at least one further communications session between the mobile server and a service, the at least one further communications session being established by the mobile server as a session proxy for the mobile communications device.

According to another embodiment is a mobile server for coupling an enterprise network to a wireless communications network that is in wireless communication with a mobile communications device associated with the enterprise network, the mobile server including a service manager for establishing, through a firewall and the wireless communications network, a first communications session between the mobile communications device and the mobile server, and for establishing concurrent with the first communications session at least one further communications session between the mobile server and a service in which the mobile server functions as a session proxy for the mobile communications device.

Figure 1:
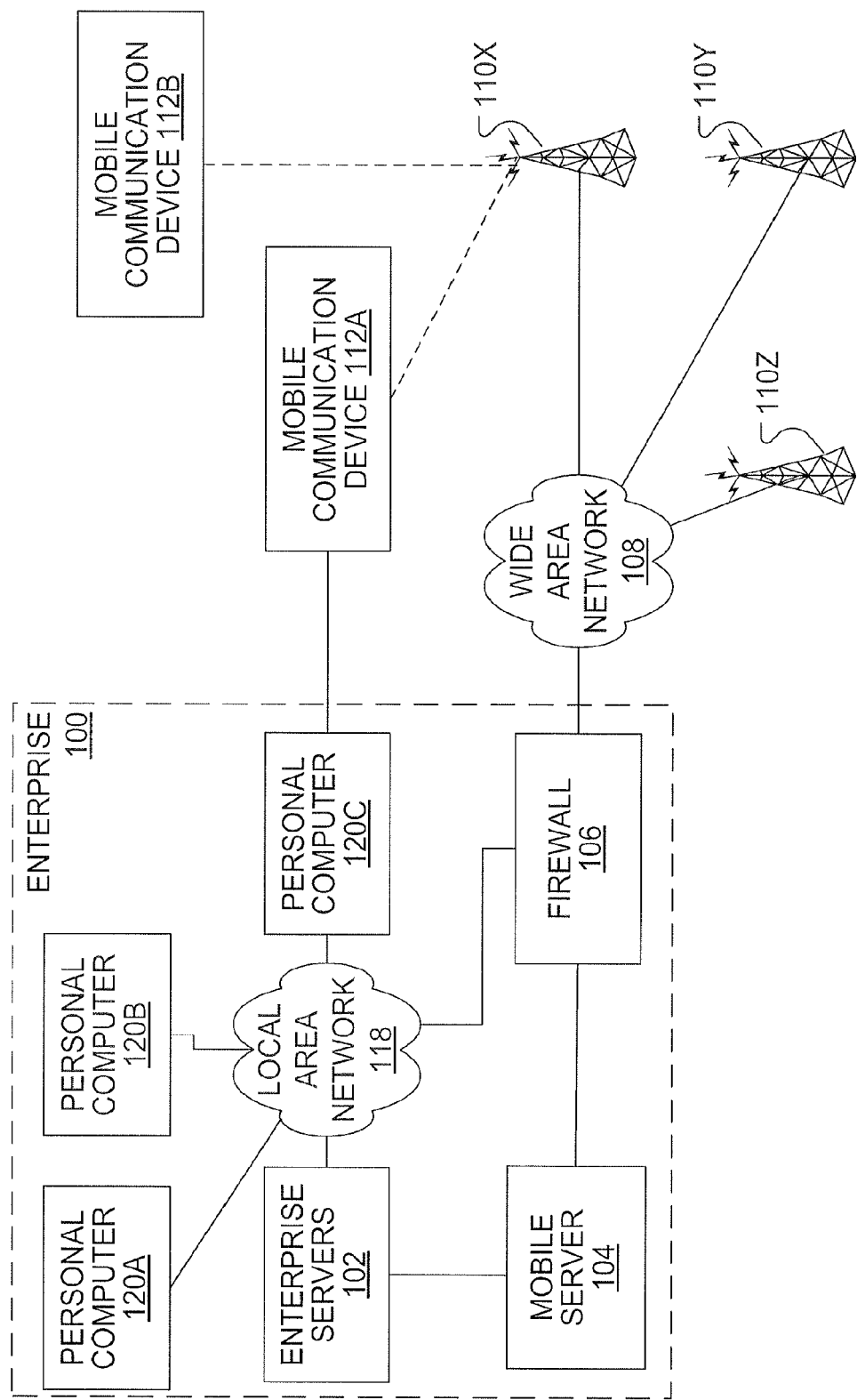
FIG. 1 illustrates a communication network including an enterprise with a wireless connection to a mobile data communication device.

As illustrated in FIG. 1, an enterprise 100 includes a local area network (LAN) 118 with a number of network nodes 120 (such as suitably configured personal computers—PCs 120A, 120B, 120C) connected to one or more enterprise servers 102 via the LAN 118. Among other things, the network nodes connected to LAN 118 may also include access points to one or more local wireless networks, and gateways to further LAN's operated within enterprise 100. The enterprise servers 102 may include for example one or more enterprise messaging servers (perhaps employing Microsoft™ Exchange Server and providing e-mail, calendar events and contact details), and one or more enterprise application servers and enterprise web servers, each enterprise server 102 being connected to a wide area network (WAN, such as the public Internet) 108 via a firewall 106. Multiple wireless carrier networks 110X, 110Y, 110Z (collectively or individually 110) operated by wireless carriers also connect to the WAN 108. Mobile communications devices, such as mobile communications devices 112A, 112B (collectively or individually 112), may be connected to one or other of the wireless carrier networks 110.

The enterprise 100 includes a mobile server 104 with a connection via the firewall 106 to the WAN 108. Among other things, the mobile server 104, which may be implemented on one or more suitably configured servers, couples the exchanger servers 102 to the wireless networks 110 by adapting communications between the enterprise servers 102 and the wireless networks 110.

Figure 2:
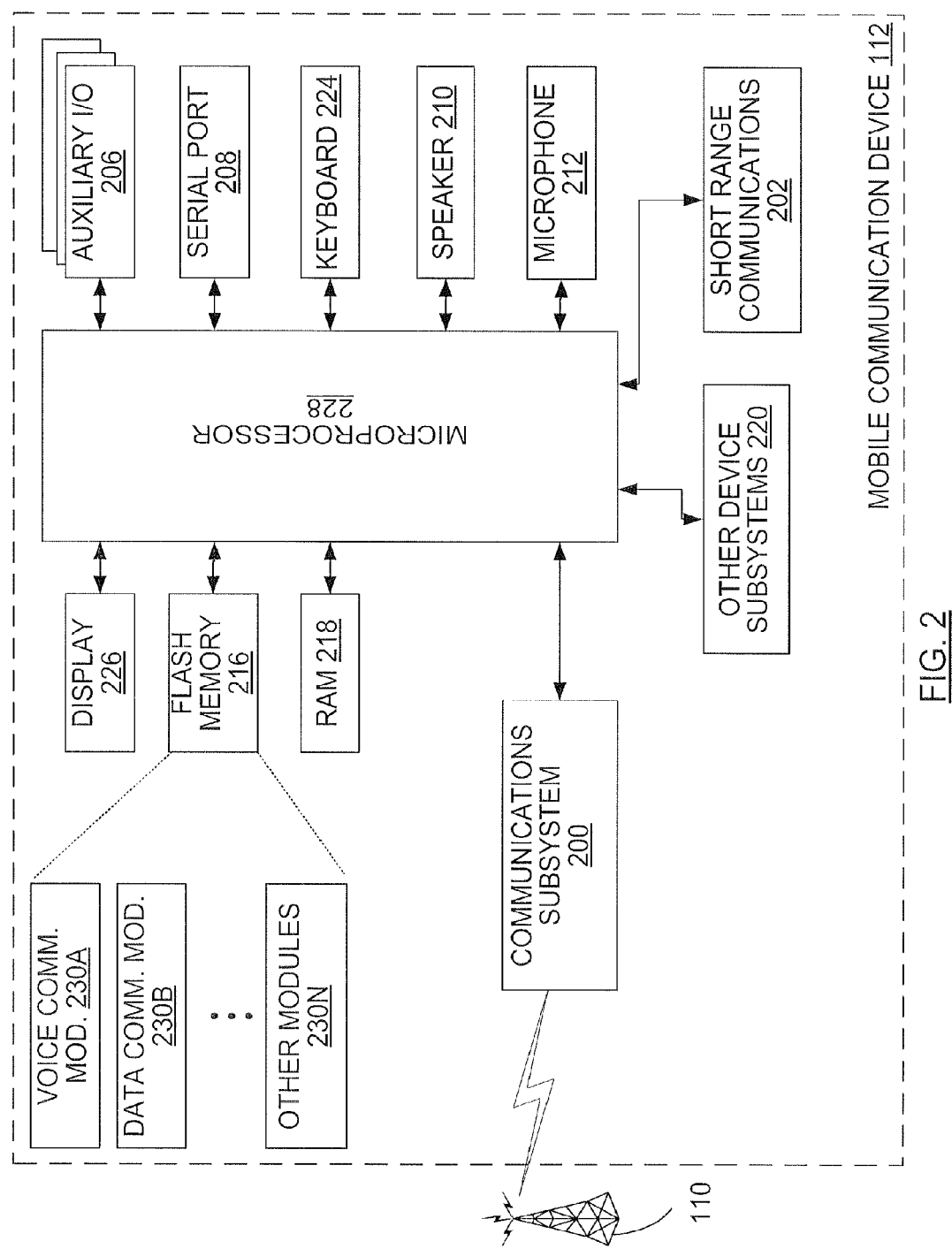
FIG. 2 illustrates components of an example of a mobile data communication device for use in the communication network of FIG. 1.

FIG. 2 illustrates an example configuration of the handheld mobile communication device 112 including a housing, an input device (a keyboard 224), an output device (a display 226) and a processing device (a microprocessor 228), which is shown schematically in FIG. 2 as coupled between the keyboard 224 and the display 226. The microprocessor 228 controls the operation of the display 226, as well as the overall operation of the mobile device 112, in response to actuation of keys on the keyboard 224 by a user. The device 112 also includes, as shown schematically in FIG. 2: a communications subsystem 200; a short-range communications subsystem 202; input/output devices in addition to the keyboard and display including a set of auxiliary I/O devices 206, a serial port 208, a speaker 210 and a microphone 212; as well as memory devices including a flash memory 216 and a Random Access Memory (RAM) 218; and various other device subsystems 220. In at least one example embodiment the mobile device 112 is a two-way radio frequency (RF) communication device having data communication capabilities and, in at least some cases, voice communication capabilities. In addition, the mobile device 112 preferably has the capability to communicate with other computer systems via the Internet.

Operating system software executed by the microprocessor 228 is preferably stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile device 112. A predetermined set of software applications that control basic device operations, such as a voice communications module 230A and a data communications module 230B, may be installed on the mobile device 112 during or after manufacture. As well, additional software modules, illustrated as other software module 230N, which may be, for instance, a personal information manager (PIM) application, may be installed during or after manufacture. The PIM application is preferably capable of organizing and managing data items, such as e-mail messages, calendar events, voice mail messages, appointments, and task items. The PIM application is also preferably capable of sending and receiving data items via the wireless carrier network 110. In some embodiments, the data items managed by the PIM application are seamlessly integrated, synchronized and updated via the wireless carrier network 110 with the device user's corresponding data items stored or associated with a host computer system.

Communication functions, including data and voice communications, are performed through the communication subsystem 200, and possibly through the short-range communications subsystem 202. The communication subsystem 200 is configured to exchange wireless signals with network 110, and will typically include one or more antennas, RF receivers and RF transmitters, and a digital signal processor for processing outgoing communications signals being sent from the microprocessor 228 and incoming communications signals destined to the microprocessor 228. The specific design and implementation of the communication subsystem 200 is dependent upon the communication network in which the mobile device 112 is intended to operate. For example, the communication subsystem 200 of the mobile device 112 may be designed to operate with the Mobitex™ DataTAC™ or General Packet Radio Service (GPRS) mobile data communication networks and also designed to operate with any of a variety of voice/data communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the mobile device 112. In some embodiments, the mobile device 10 is configured to also communicate in wireless local area networks (WLAN), and communications subsystem 200 may be configured to also exchange signals in such networks.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Subscriber Identify (IMSI) number.

When required network registration or activation procedures have been completed, the mobile device 112 may send and receive communication signals over the wireless carrier network 110.

The short-range communications subsystem 202 enables communication between the mobile device 112 and other proximate systems or devices, which need not necessarily be similar devices. For example, the short-range communications subsystem may include an infrared device and associated circuits and components, or a Bluetooth™ communication module to provide for communication with similarly-enabled systems and devices.

Figure 3:
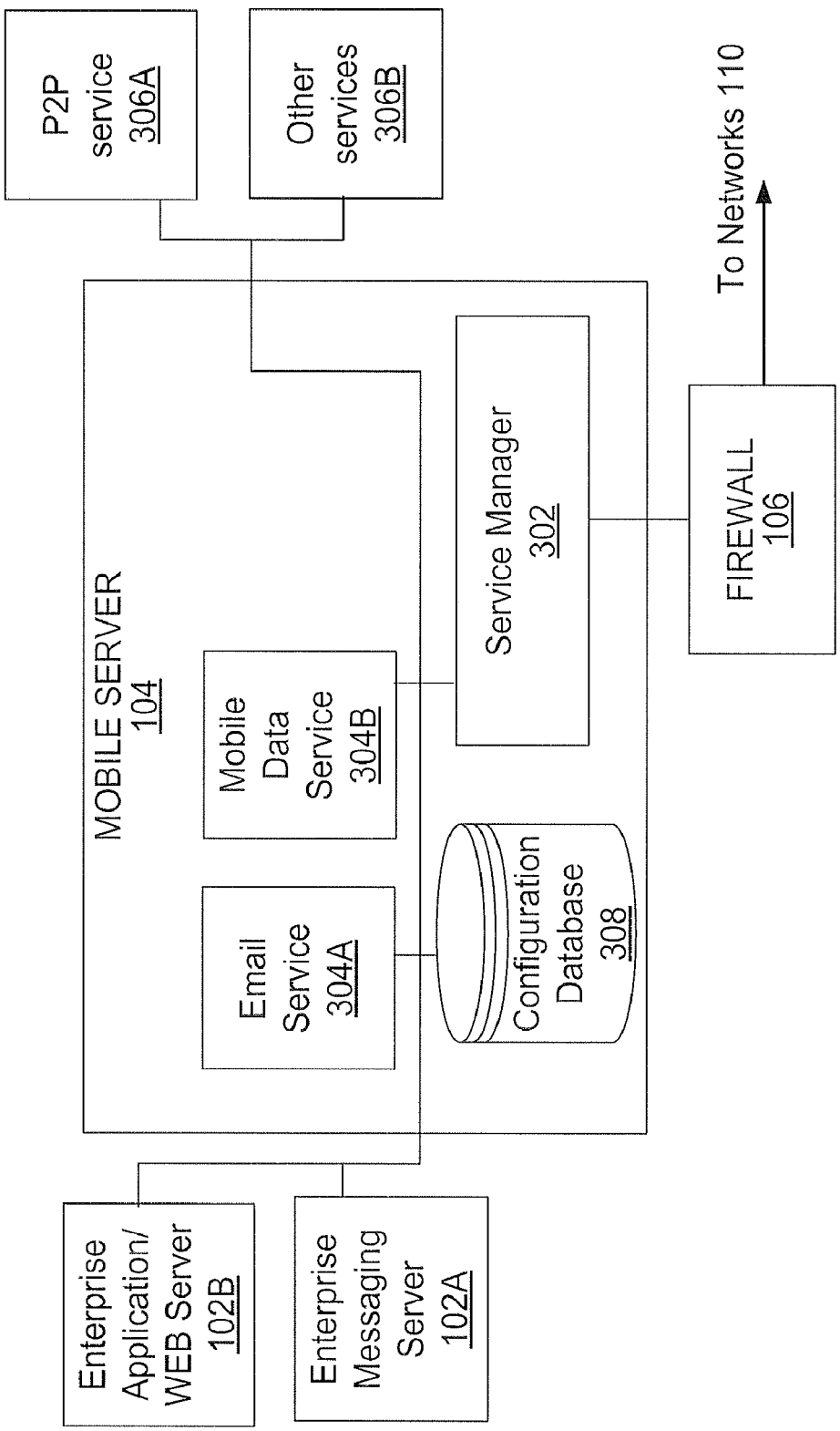
FIG. 3 illustrates components of a mobile server for use in the communications network of FIG. 1.

FIG. 3 schematically illustrates the mobile server 104 in greater detail. In an example embodiment, the mobile server 104 includes local service agents or modules 304A, 304B (collectively or individually 304) for providing services to mobile communication devices 112, including, for example, a messaging service module 304A and a mobile data service module 304B. The mobile server 104 can also be connected to external services 306A, 306B (collectively or individually 306) that are accessible to the mobile communications devices 112, including for example an instant messaging ("IM") service or a peer-to-peer ("P2P") messaging service 306A, and other external services (represented generically in FIG. 3 as "Other Service" 306B). External services refer to services that are not implemented directly by the wireless server 104. For example, another external services could include a Telelocator Network Paging Protocol ("TNPP") service.

The actual services 304, 306 available through the mobile server 104 can vary, however to facilitate an understanding of the system described herein, example services with be briefly described. In an example embodiment, email service module 304A couples a traditional messaging server 102A to a wireless network 110 by adapting email messages from the messaging server 102A for transport over the wireless network to a receiving mobile communication device 112, and adapting email messages received from a sending mobile communications device to a format suitable for the messaging server 102A. Mobile data service module 304b couples a traditional application/Web server 102B (which may be separate servers) to the wireless network 110 by adapting applications/Web pages and other content received from or through the application/Web server 102B for transport over the wireless network to a receiving mobile communication device 112. Services 304A and/or 304B could in some embodiments be external services.

With respect to P2P service 306A, such service allows mobile communications devices 112 within wireless network 110 to communicate with each other, for example through text messages. With reference to FIG. 1, for example, through P2P communications, Mobile Communication Device 112B can send a message to mobile communications device 112A and vice versa, without going through the messaging server 102A. In an example embodiment, the P2P service 306A, which may be located within the enterprise 100 or may be external to enterprise network 100, routes the P2P message and manages the P2P connection.

The mobile server 104 includes a service manager module 302 which, as will be explained in greater detail below, functions as a service or session proxy between individual mobile communications devices 112 and at least some of the various services 304, 306. The mobile server 104 and its service manager 302 are configured to allow a mobile communications device 112 to maintain a single connection with the service manager 302, which in turn maintains connections on behalf of the mobile communications device 112 with the individual services required by the mobile communications device 112.

In FIG. 1, the mobile device 112A may become associated with the enterprise 100 through a connection between the mobile device 112A and the PC 120C (for example through a wired link between of the serial port 208 of device 112A and the PC 120C, or through a link through short range communications systems 202, or through a link through a WLAN) while an association process is executed at the PC 120C. The result of the association process may be the uploading of a unique device identifier of the mobile device 112 to the PC 120C and the downloading of a Unique Identifier (UID) of the mobile server 104 from the PC 120C to the mobile device 112. The device identifier may be considered a characteristic of the mobile device 112 (e.g., a device identifier may be burned into the mobile device 112). The UID of the mobile server 104 normally does not change.

In an example embodiment, to provide centralized wireless management services, the mobile server 104 establishes a communication path with the multiple wireless carrier networks 110. Specifically, the mobile server 104 may have an established communication path with each of the wireless carrier networks 110Y, 110Z that is connected to the WAN 108 through a virtual private network (VPN). The mobile server 104 also establishes communication paths with any external services 306 that are required by the active mobile communications devices 112.

With the described set-up, the mobile server 104 may provide centralized management of wireless communications, as follows. After the mobile device 112 registers (in conventional fashion) with one of the wireless carrier networks 110 with which the mobile server 104 has an established communications path, the mobile device 112 sends a registration packet with its device identifier and the UID of the mobile server 104 with which the mobile device 112 is associated. This registration packet is received by the wireless carrier network 110X and directed to the mobile server 104 with an identity of the wireless carrier network 110X. On receiving this registration packet, the mobile server 104 associates the wireless carrier network 110X with the device identifier, and the mobile communications device 112 is registered for an active session with the mobile server 104. Note that the term "packet" is used herein for an addressed unit of data that may also be called a "message", a "frame" or, more generically, a "protocol data unit".

In an example embodiment, once an active session is opened between a mobile communication device 112 and a mobile server 104, the mobile communications device is configured to send a service registration packet or series of such packets to the mobile server 104 advising the mobile server 104 of the services that are required by the mobile communications device 112. In at last one example embodiment, services that are available to the mobile communications device will also each have a unique service identifier associated with them. For example, P2P service 306A and Other Service 306B will each have a unique service identifier, which may for example be a unique IP address among other things. In the illustrated example as Email service 304A and mobile data service 304A are integrated into the mobile server 104 their unique service identifier may be the same as the UID of the mobile server.

In an example embodiment, the unique service identifiers for each of the services required by a mobile communication device are included in the service registration packets sent by the mobile communication device 112 and received by the mobile server 104. In some embodiments, the mobile server 104 may associate service identification information received from the mobile communication device with a unique service identifier or service address by referring to look-up tables or similar correlating information maintained in a configuration database 308. In some embodiments, a pre-configured set of default services for each of the mobile communications devices 112 associated with the enterprise 100 are stored in configuration database 308 such that there is no need for a mobile communications device 112 to advise the mobile server 104 of its required services through service registration packets upon setting up of an active session between the mobile communications device 112 and the mobile server 104. In some embodiments, a mobile communications device 112 may provide periodic updates to the mobile server 104 during an active session advising of any changes in the services that it requires during the session (for example, addition of new services, or dropping of services that are no longer required.)

Thus, it will be appreciated that when an active session is established between a mobile server 104 of enterprise 100 and a mobile communication device 112, the mobile server 102 has access to information about the services required by the mobile communication device 112. Among other possible sources, such required service information may come from service registration packets sent by the device 112, from configuration information associated with the mobile device 112 and stored on the configuration database 308 of mobile server 104, or from both of these potential sources. The service manager 302 of the mobile server 104 uses this required service information to set up and maintain sessions on behalf of the mobile communications device 112 with each of the identified services, such that the mobile communications device 112 only needs to maintain a single session with the mobile server 104 rather than multiple sessions.

In one example embodiment, the service manager 302, upon establishment of an active session with a mobile communication device 112 and upon receipt of the required service information will send a session initiation request packet to the required services such as P2P service 306A and Other Service 306B, for example (with respect to services internally managed in the mobile server 104 such as email service 304A and mobile data service 304B initiation of a separate session may not be required in some embodiments). The request will include an address of the device (which may be the unique device identifier, but could also be a different address that is mapped to the unique device identifier by the service manager 302). The request will also include the UID (or other unique address) of the mobile server 104. Thereafter, packets sent from each of the services destined to the mobile communication device 112 will be received at the mobile server 104 on behalf of the mobile communications device, and then forwarded by the mobile server 104 to the mobile communication device 112. In some example embodiments, the data provided from an external service 306 is encrypted at the external service such that the mobile server 104 that receives the data from the external service on behalf of a mobile device is unable to read or modify the data.

In some communications systems, in order to maintain an active session with a service the mobile communications device has to periodically send out a "ping" or notification message advising the service that the mobile communications is still active. In at least some example embodiments, when the mobile server 104 receives such a ping or status notification from the mobile communications device 112, it sends a ping or notification on behalf of the mobile communications device 112 to all of the services that the mobile server 104 is maintaining sessions with for the mobile communications device 112. Thus, a single notification message from the mobile communications device 112 can be used to maintain a number of active sessions with a number of services.

In some embodiments, using the mobile server 104 as a session proxy to a plurality of required services, has the result that only a single session needs to be maintained through the wireless communications network to the mobile communications device, thereby in some cases reducing over the air traffic in the wireless network and reducing operating demands on the mobile communications device 112, which in turn can reduce the drain on the battery of the device. Furthermore, the mobile server 104 takes on at least some of the overhead of negotiating and maintaining sessions to the plurality of services, reducing the burden that would otherwise be placed on the mobile device if it had to negotiate the sessions directly.

The mobile server 104 is itself a "service" from the perspective of the mobile communications device 112, which maintains sessions to other services on behalf of the mobile communications device 112. In this regard, in at least some example embodiments, the functionality of the service manager 302 could be implemented on servers other than the mobile server 104 in other locations, for example at Other Service 306B, such that a primary session could be maintained, through a firewall, between the Other Service 306B and the mobile communications device 112, and the serve manager 302 implemented at the Other Service then used to maintain proxy sessions on behalf of the mobile communications device 112 with a number of other services, including the mobile server 104.

In some embodiments, a mobile communication device 112 may maintain sessions with a plurality of mobile servers 104, in which case one of the mobile servers 104 has to take ownership of the proxy sessions and advise the respective services accordingly. In some embodiments, the mobile device 112 has a prioritized list of which mobile servers 104 to try and establish a direct session with, and once the mobile device 112 is successful in establishing a session with a particular mobile server 104, that device connected mobile server 104 than establishes proxy sessions on behalf of the mobile device 112 with the other mobile servers 104 and other services as required, in the manner described above.

Other modifications will be apparent to those skilled in the art.

What is claimed is:

1. A method of communicating between a mobile communications device and a plurality of services that are used by the mobile communications device, comprising:
    establishing a first communications session, through a firewall and a wireless network, between the mobile communications device and a first mobile server including at least one local service module adapted to provide services to the mobile communication device, the first mobile server located in an enterprise network with which the mobile communications device is associated;
    establishing, concurrent with the first communications session, a further communications session between the first mobile server and a further mobile server located behind a further firewall, the further communications session being established by the first mobile server as a session proxy for the mobile communications device;
    receiving, at the first mobile server, service identification information identifying selected services;
    determining, at the first mobile server and based on the received service identification information, the selected services to which to establish even further communications sessions; and
    responsive to the determining, establishing, concurrent with the first communications session and while acting as the session proxy for the mobile communications device, the even further communications sessions with the selected services, each of the even further communications sessions being established by the first mobile server.

2. The method of claim 1 wherein the receiving the service identification information comprises retrieving the service identification information from a configuration database at the first mobile server.

3. The method of claim 1 including receiving, at the first mobile server from the mobile communications device through the first communications session, a first status notification message and, in response to the first status notification message, transmitting, from the first mobile server to at least some of the services, a second status notification message on behalf of the mobile communications device, thereby maintaining the communications sessions with the at least some of the services.

4. The method of claim 1 wherein the first mobile server includes an email service adapted to forward email messages to the mobile communications device and the service with which the further communications session is established includes a peer to peer communications service for communications between mobile communications devices.

5. A first mobile server for coupling an enterprise network to a wireless communications network that is in wireless communication with a mobile communications device associated with the enterprise network,
    the first mobile server comprising a service manager configured to establish a first communications session, through a firewall and a wireless network, between the mobile communications device and the first mobile server, including at least one local service module adapted to provide services to the mobile communication device,
    the first mobile server adapted to:
        establish, concurrent with the first communications session, a further communications session between the first mobile server and a further mobile server located behind a further firewall, the further communications session being established by the first mobile server acting as a session proxy for the mobile communications device;
        receive service identification information identifying selected services;
        determine, based on the service identification information, the selected services to which to establish even further communications sessions; and
        establish, concurrent with the first communications session and while acting as the session proxy for the mobile communications device, the even further communications sessions with the selected services.

6. The first mobile server of claim 5 further comprising:
    a configuration database storing the service identification information associated with the mobile communications device;
    wherein the service manager is further configured to receive the service identification information by retrieving the service identification information from the configuration database.

7. The first mobile server of claim 5 wherein the service manager is further configured to receive, from the mobile communications device through the first communications session, a first status notification message and, in response to the first status notification message, to transmit, to at least some of the services, a status notification message on behalf of the mobile communications device to maintain the communications sessions with the at least some of the services.

8. The first mobile server of claim 5 further comprising a messaging service module adapted to configure email messages for sending to the mobile communications device.

9. The first mobile server of claim 5 further comprising a mobile data service module configured to adapt content for sending to the mobile communications device.

10. A non-transitory computer program product comprising a computer readable medium and, stored in the computer readable medium, program code for enabling communications between a mobile communications device and a plurality of services that are used by the mobile communications device, the program code including instructions which when executed in an enterprise network cause the enterprise network to:

establish a first communications session, through a firewall and a wireless network, between the mobile communications device and a first mobile server including at least one local service module adapted to provide services to the mobile communication device, the first mobile server located in the enterprise network with which the mobile communications device is associated;

establish, concurrent with the first communications session, a further communications session between the first mobile server and a further mobile server located behind a further firewall, the further communications session being established by the first mobile server as a session proxy for the mobile communications device;

receive service identification information identifying selected services;

determine, based on the service identification information, the selected services to which to establish even further communications sessions; and establish, concurrent with the first communications session and while acting as the session proxy for the mobile communications device, the even further communications sessions with the selected services.

* * * * *